(12) United States Patent
DeBruin et al.

(10) Patent No.: US 7,638,596 B2
(45) Date of Patent: Dec. 29, 2009

(54) CRYSTALLIZER TEMPERATURE CONTROL VIA JACKETING/INSULATION

(75) Inventors: Bruce Roger DeBruin, Lexington, SC (US); Richard Gill Bonner, Lexington, SC (US)

(73) Assignee: Eastman Chemical Company, Kingsport, TN (US)

( * ) Notice: Subject to any disclaimer, the term of this patent is extended or adjusted under 35 U.S.C. 154(b) by 218 days.

(21) Appl. No.: 11/439,908

(22) Filed: May 24, 2006

(65) Prior Publication Data

US 2007/0276119 A1 Nov. 29, 2007

(51) Int. Cl.
C08F 6/00 (2006.01)
C08G 64/00 (2006.01)

(52) U.S. Cl. .............. 528/480; 165/80.4; 165/170; 165/185; 264/176.1; 264/219; 528/196; 528/198; 528/308.1; 528/308.2

(58) Field of Classification Search ............ 264/176.1, 264/219; 528/308.1, 308.2, 480, 196, 198; 165/80.4, 170, 185
See application file for complete search history.

(56) References Cited

U.S. PATENT DOCUMENTS

| | | | |
|---|---|---|---|
| 3,282,909 | A | 11/1966 | Manuel et al. |
| 3,544,525 | A | 12/1970 | Balint et al. |
| 3,969,324 | A | 7/1976 | Berkau et al. |
| 4,137,394 | A | 1/1979 | Meihuizen |
| 4,226,973 | A | 10/1980 | Malo et al. |
| 4,678,646 | A | 7/1987 | Watanabe et al. |
| 4,784,766 | A * | 11/1988 | Moritoki et al. ............ 210/181 |
| 4,923,649 | A * | 5/1990 | Hsieh et al. ............ 264/37.24 |
| 5,310,515 | A | 5/1994 | Jurgen et al. |
| 5,434,316 | A | 7/1995 | Kissinger |
| 5,633,018 | A | 5/1997 | Stouffer et al. |
| 5,714,571 | A | 2/1998 | Al Ghatta et al. |
| 6,255,435 | B1 | 7/2001 | Hait et al. |
| 6,479,625 | B1 * | 11/2002 | Moore ................. 528/481 |
| 7,192,545 | B2 | 3/2007 | Ekart et al. |
| 7,501,482 | B2 | 3/2009 | DeBruin et al. |
| 2002/0033131 | A1 | 3/2002 | Bostrom et al. |
| 2002/0171159 | A1 | 11/2002 | Matthaei et al. |
| 2004/0176565 | A1 | 9/2004 | Lee et al. |
| 2004/0242774 | A1 | 12/2004 | Fujimura |
| 2005/0004341 | A1 | 1/2005 | Culbert et al. |
| 2005/0059746 | A1 * | 3/2005 | Moncada Andres et al. ... 521/48 |
| 2005/0062186 | A1 | 3/2005 | Fellinger |
| 2005/0065318 | A1 | 3/2005 | Jernigan |
| 2005/0085620 | A1 * | 4/2005 | Bruckmann ............ 528/480 |
| 2005/0110182 | A1 * | 5/2005 | Eloo ................. 264/69 |
| 2005/0110184 | A1 | 5/2005 | Eloo |
| 2005/0154183 | A1 * | 7/2005 | Ekart et al. ............ 528/486 |
| 2005/0272914 | A1 | 12/2005 | McElvain et al. |
| 2006/0047103 | A1 | 3/2006 | Armentrout et al. |
| 2007/0149756 | A1 | 6/2007 | Kulkarni |

FOREIGN PATENT DOCUMENTS

| | | |
|---|---|---|
| DE | 103 49 016.7 | 10/2003 |
| DE | 10 2004 015 515.1 | 3/2004 |
| DE | 10 2004 021 595.2 | 5/2004 |
| WO | WO 98/18847 A | 5/1998 |
| WO | WO 2004/033174 A1 | 4/2004 |

OTHER PUBLICATIONS

H.D. Keith; Crystallization of Polymers from the Melt and the Structure of Bulk Semicrystalline Polymers; 1967; pp. 421-438; Bell Telephone Laboratories, Inc., Murray Hill, NJ.
Bae et al.; Crystallization-induced Sequential Reordering in Poly(trimethylene terephthalate)/Polycarbonate Blends; Macromolecular Research; 2002; pp. 145-149; vol. 10, No. 3; Polymer Society of Korea.
International Search Report International Application No. PCT/US 07/11803.
European Search Report dated May 6, 2009 in corresponding EP application 07794963.4.
Notice of Allowance dated Apr. 30, 2009 in co-pending U.S. Appl. No. 11/440,192.
Office Action dated Mar. 30, 2009, from co-pending U.S. Appl. No. 11/440,142.
Office Action dated Apr. 10, 2008, from co-pending U.S. Appl. No. 11/440,192.
Office Action dated Aug. 1, 2008, from co-pending U.S. Appl. No. 11/440,192.
Office Action dated Jan. 5, 2009, from co-pending U.S. Appl. No. 11/440,192.

* cited by examiner

*Primary Examiner*—Terressa M Boykin
(74) *Attorney, Agent, or Firm*—Jennifer R. Knight; Bernard J. Graves, Jr.

(57) ABSTRACT

A method of crystallizing a plurality of crystallizable polymer pellets includes a step in which the pellets passed through regions that are temperature adjusted by a heat transfer jacket. The heat transfer jacket adjusts the temperature of the pellets by having a temperature sufficient to allow at least partial crystallization of the plurality of polymeric pellets while maintaining the average pellet temperature of the plurality of pellets below the melting temperature of the pellets. A crystallizer implementing the methods of the invention is also provided.

33 Claims, 10 Drawing Sheets

CRYSTALLIZER TEMPERATURE CONTROL VIA JACKETING/INSULATION

FIELD OF THE INVENTION

The present invention relates generally to methods and systems of crystallizing polymer pellets and more specifically to methods and systems of crystallizing polyester pellets.

BACKGROUND OF THE INVENTION

Thermoplastic resins are used in a multitude of commercial applications. Polyesters such as polyethylene terephthalate (PET), polyethylenenaphthalate (PEN), and similar polymers and copolymers, in particular, have become staple commodities whose manufacture is well known and mature. Applications of polyesters includes food, beverage, and other liquid containers as well as synthetic fibers. Several polyesters such as PET may exist both in amorphous and semi-crystalline forms. Amorphous PET is transparent while crystalline PET is opaque.

In the conventional PET process, PET is formed by esterification of terephthalic acid and ethylene glycol in a reaction vessel to form a pre-polymeric mixture. The esterification need not be catalyzed. The pre-polymeric paste is subsequently heated to promote polymerization. The resulting mixture is then subjected to polycondensation in a melt at elevated temperatures, for example, 285° C., in the presence of a suitable catalyst. Compounds of Sn, Sb, Ge, Ti, or others have been used as polycondensation catalysts. The polymer is extruded directly from the polycondensation reactor into strands. The hot, extruded strands are contacted with cool water prior to chopping into pellets, dried, and stored into silos prior to crystallizing.

Pelletizing processes wherein strands are stretched prior to pelletizing are disclosed in U.S. Pat. No. 5,310,515. Conventional wisdom dictates that at least the surface of the pellets must be cooled to 20° C. to 30° C. to avoid sintering during storage. During storage, heat from the hotter interior of the pellets is distributed throughout the pellets. Thus, warm pellets, i.e., pellets whose exterior is significantly higher than 20° C. to 30° C. might agglomerate during storage following temperature equilibration. In addition to the decrease in temperature brought about by contact with water, the pellets can be further cooled to the desired temperature with cool air, nitrogen, or inert gas. The pellets are stored, and then subsequently reheated to the desired crystallization temperature. These steps of heating, cooling, and reheating result in a significant energy penalty in an already energy intensive process. The crystallization of the hot pellets can be accomplished in a crystallizing shaker or fluid bed. Solid stating is used to both raise inherent viscosity and remove acetaldehyde.

With reference to FIGS. 1A, 1B, and 1C, diagrams of PET manufacturing facilities are provided. PET processing facility 10 includes mixing tank 12 in which terephthalic acid ("TPA") and ethylene glycol ("EG") are mixed to form a paste. This pre-polymeric paste is transferred and heated in esterification reactor 14 to form an esterified monomer. The pressure within esterification reactor 14 is adjusted to control the boiling point of the ethylene glycol and help move the products to esterification reactor 16. The monomer from esterification reactor 14 is subjected to additional heating in esterification reactor 16 but this time under less pressure than in esterification reactor 14. Next, the monomers from esterification reactor 16 are introduced into pre-polymer reactor 18. The monomers are heated while within pre-polymer reactor 18 under a vacuum to form a pre-polymer. The inherent viscosity of the pre-polymer begins to increase within pre-polymer reactor 18. The pre-polymer formed in pre-polymer reactor 18 is sequentially introduced into polycondensation reactor 20 and then polycondensation reactor 22. The pre-polymer is heated in each of polycondensation reactors 20, 22 under a larger vacuum than in pre-polymer reactor 18 so that the polymer chain length and the inherent viscosity are increased. After the final polycondensation reactor, the PET polymer is moved under pressure by pump 24 through filters 26, 28 and through dies 30, 32, 34, forming PET strands 36, 38, 40 (see FIG. 1B).

With reference to FIG. 1B, a method for forming polyester pellets is illustrated. Extruded polymer strands 36, 38, 40 are cooled by water spray streams 42, 44, 46 onto the strands as the strands emerge from dies 30, 32, 34. After emerging from dies 30, 32, 34, strands 36, 38, 40 are cut by cutters 54, 56, 58 into pellets 48, 50, 52 while the strands are still hot. Polyester pellets formed in this manner tend to have a cylindrical shape, but can be modified to cubic, dog bone, or other shapes. At this point in the process, polyester pellets are usually amorphous. The polyester pellets are typically crystallized before being shipped to a customer. Such crystallization allows subsequent drying at higher temperatures so that the polyester may be extruded as desired. Crystallization of the polyester pellets is typically achieved by reheating the pellets to a temperature above the crystallization temperature. As the pellets crystallize, additional heat is derived due to the generated heat of crystallization. This additional heat tends to make the pellets soft and adherent to each other. Therefore, the pellets are agitated to avoid them sticking together due to softening. After crystallization, the pellets are generally solid stated to raise inherent viscosity with inert gas passing around the hot pellets.

With reference to FIG. 1C, a schematic of an alternative pellet forming process is provided. In this variation, strands 60, 62, 64 emerging from die dies 66, 68, 70 are cut into pellets 72, 74, 76 under water by die face cutters 80, 82, 84. In this variation, the extruded polyester strands are completely immersed and cut underwater upon exiting dies 66, 68, 70. Pellets 72, 74, 76 formed in this manner tend to have a spherical shape because of the surface tension of the molten polyester when emerged in water. Initially, after cutting, pellets 72, 74, 76 still retain a substantial amount of heat in the interior. Subsequently, the pellet/water combination is sent to dryer 90 via conveying system 92. Examples of useful dryers include centripetal dryers that remove pellets 72, 74, 76 from the water. Upon exiting dryer 90, additional water is boiled off due to the heat content of pellets 72, 74, 76, which is still high upon emerging from dryer 90. If the pellet/water combination is transported to the dryer sufficiently fast the polyester pellets may retain sufficient heat for crystallization to occur. Pellets 72, 74, 76 are then transferred to crystallizer 94 where they reside for a residence time (about 2 to 20 minutes) for crystallization to occur. Crystallizer 94 also provides sufficient agitation to inhibit the polyester pellets from sticking together.

International Patent Appl. No. WO2004/033174 and U.S. Pat. Appl. Nos. 20050110182 and 20050110184 disclose methods for crystallizing polymeric pellets. International Patent Appl. Nos. WO2004/033174 discloses a method in which polymeric pellets are treated in a liquid bath (e.g., water bath) at an elevated temperature to induce crystallization. U.S. Pat. Appl. Nos. 20050110182 and 20050110184 disclose method in which air is injected into the pellet/water slurry of FIG. 1C in order to transport the pellets quickly to and through dryer 90.

After crystallization, pellets 72, 74, 76 are transported by dense phase convey system 96 to one or more pellet processing stations. Such dense phase convey systems utilize air to move the pellets from one location to another. For example, the pellets are transported to a blending silo in which the average properties of the pellets might be adjusted. In such blending silos, polyester pellets are mixed together to achieve a target specification. Such specification may be with respect to color, molecular weight, catalyst concentration, additive concentration, density, and the like. In still another example, the pellets are conveyed to a solid stating process reactor. It should be noted, that dense phase convey systems tend to be more useful than dilute phase convey systems in this application since dilute phase convey systems can result in the surface of the pellets being melted or have high impact velocities thereby forming undesirable streamers and fines.

Although these methods and systems for making polymeric pellets and, in particular, polyester pellets work well, the equipment tends to be expensive to fabricate and to maintain. A typical PET manufacturing line may include several crystallizers each of which utilizes a rather large motor and occupies a larger footprint in the manufacturing plant. The initial capital investment of such crystallizer may easily exceed a million dollars.

Accordingly, there exists a need for polymer processing equipment and methodology that is less expensive to install, operate, and maintain.

SUMMARY OF THE INVENTION

The present invention overcomes one or more problems by providing in at least one embodiment a method of crystallizing polymer pellets. The method of the present embodiment includes a step in which a plurality of polymeric pellets are introduced into a crystallizer. For crystallization to be possible, the polymeric pellets must be formed from one or more polymers that are crystallizable. Such crystallizable polymers are characterized by a crystallization temperature and a melting temperature. Moreover, the plurality of polymeric pellets is characterized with an average pellet temperature. The plurality of polymeric pellets is introduced into the crystallizer with an initial average temperature. While within the crystallizer, the plurality of pellets are conveyed through one or more regions of the crystallizer in which the temperature is adjusted by one or more heat transfer jackets to provide a temperature within the one or more regions that is sufficient allow at least partial crystallization of the plurality of polymeric pellets while maintaining the average pellet temperature below the melting temperature. In other variations, the pellets also pass through one or more regions that are insulated. Finally, the plurality of polymer pellets is removed from the outlet of the crystallizer.

In another embodiment of the present invention, a crystallizer for crystallizing amorphous polymeric pellets is provided. The crystallizer of this embodiment includes an inlet for receiving a plurality of polymeric pellets and an outlet for removing the pellets. The crystallizer further comprises one or more heat transfer jacket for adjusting the average temperature of the pellets. The crystallizer also includes a conveyor for transporting the plurality of pellets from a first location to a second location.

Additional advantages and embodiments of the invention will be obvious from the description, or may be learned by practice of the invention. Further advantages of the invention will also be realized and attained by means of the elements and combinations particularly pointed out in the appended claims. Thus, it is to be understood that both the foregoing general description and the following detailed description are exemplary and explanatory of certain embodiments of the invention and are not restrictive of the invention as claimed.

DETAILED DESCRIPTION OF THE INVENTION

Figure 1A:
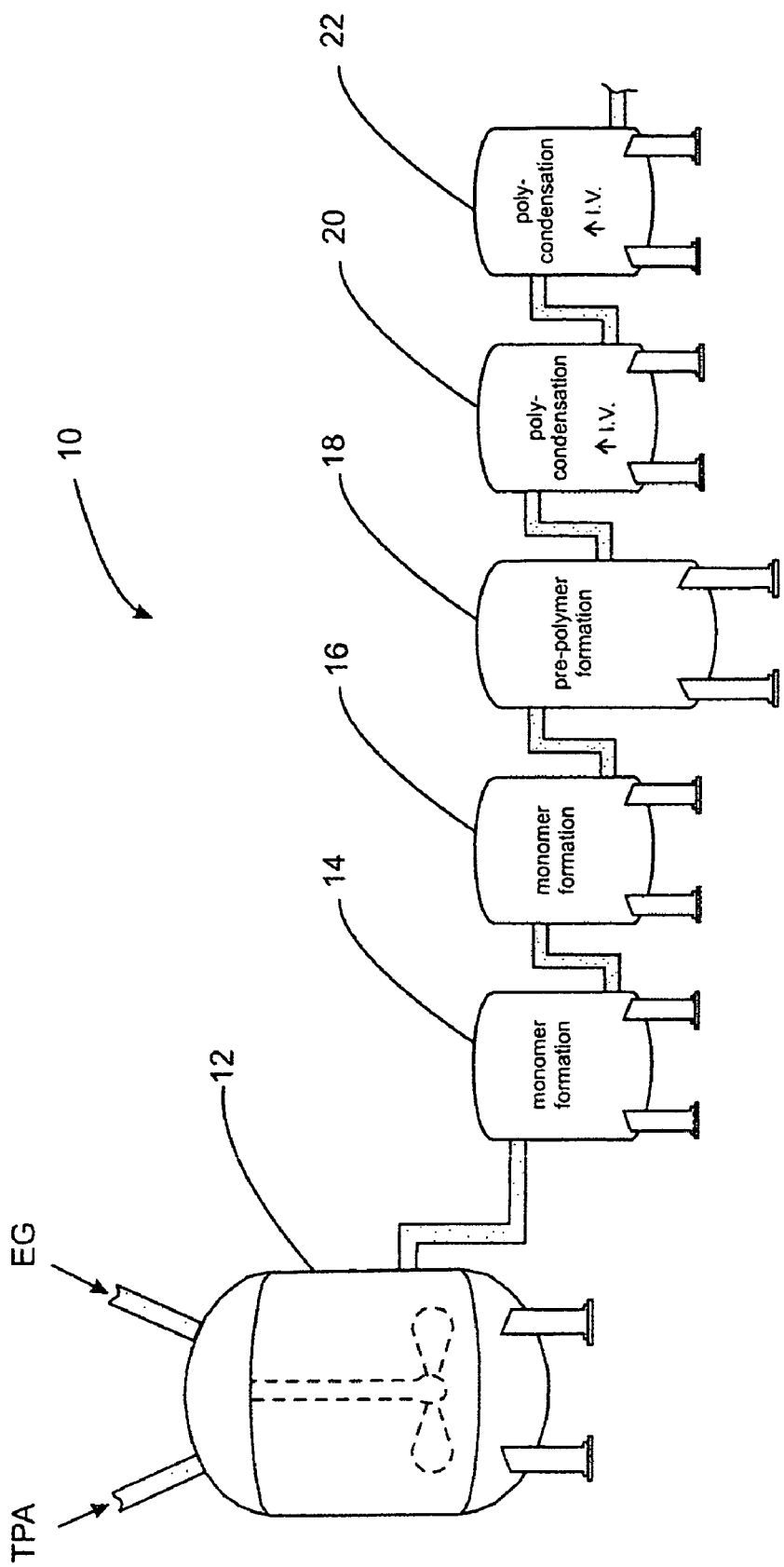
FIG. 1A is a schematic illustration of a polyester manufacturing line through the polycondensation reactors.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "polymeric pellet" as used herein means a three dimensional object formed from a polymer. Such polymeric objects include a largest dimension that is greater than or equal to the extent of the polymeric object in any direction. Polymeric pellets occur in a number of shapes such as spherical, cylindrical, and the like. The largest dimension of a sphere is the diameter.

The term "heat of crystallization" as used herein means the quantity of heat released as a unit of mass of a substance crystallizes.

The term "crystallization temperature" as used herein means the temperature at which at least part of a material begins to crystallize.

The term "melting temperature" as used herein means the temperature at which at least part of a material is transformed from a crystalline state to a liquid. When a material undergoes such a transformation over a temperature range, for purposes of the present invention, the melting temperature is the median temperature of such a range. Typically, amorphous pellets melt at a lower temperature than crystalline pellets.

The term "degree of crystallinity" as used herein means the fractional amount of crystallinity in a polymeric sample. In the present invention, the degree of crystallinity is the average fractional amount of crystallinity in the polymeric pellets. Degree of crystallinity is expressed as either a weight percent or a volume percent. As used herein, the degree of crystallinity is expressed as a weight percent unless expressly stated to be otherwise. The degree of crystallinity can be determined by differential scanning calorimetry ("DSC").

In an embodiment of the present invention, a method of crystallizing a plurality of polymeric pellets is provided. The plurality of polymeric pellets in accordance with the present invention is introduced into a crystallizer. In general, the plurality of pellets to be crystallized in accordance with the present invention are amorphous pellets or pellets with less than a desired degree of crystallinity. In a variation of the present embodiment, the degree of crystallinity of the pellets prior to crystallization is less than 30 wt. %. In another variation of the present embodiment, the degree of crystallinity of the pellets prior to crystallization is less than 20 wt. %. In still another variation of the present embodiment, the degree of crystallinity of the pellets prior to crystallization is less than 10 wt. %.

After crystallization, the degree of crystallinity is typically greater than 30 wt %. In other variations, after crystallization, the degree of crystallization is greater than 40 wt. %. For most applications, the degree of crystallinity after crystallization is less than 70 wt %. In other variations, the degree of crystallinity after crystallization is less than 60 wt %. In still other variations, the degree of crystallinity after crystallization is less than 50 wt %.

Advantageously, the polymeric pellets that are to be crystallized include any crystallizable polymer. The crystallizable polymers are characterized by a crystallization temperature and a melting temperature. Examples of such polymers include, but are not limited to, polyesters, polyolefins, polystyrenes, nylons, and polyketones. Polymers that have a relatively high heat of crystallization are most useful. In a variation, the heat of crystallization of such useful polymers is such that the heat of crystallization divided by the heat capacity of the polymer is at least 5° C. A crystallization temperature and a melting temperature additionally characterize the crystallizable polymers. The present embodiment is particularly useful for crystallizing polyalkylene terephthalate polymers, especially polyethylene terephthalate polymers.

The polyalkylene terephthalate polymers exiting the melt phase polymerization process, or as introduced into the crystallizer or crystallization zone, have an It.V. of at least 0.50 dL/g, or at least 0.55 dL/g, or at least 0.6 dL/g, and especially at least 0.70 dL/g, or at least 0.72 dL/g, or at least 0.74 dL/g, or at least 0.76 dL/g, or at least 0.78 dL/g, and up to about 1.2 dL/g, or 1.1 dL/g, or 0.9 dL/g. The partially crystallized polyester polymers are also advantageously not solid state polymerized. Thus, there is also provided an embodiment encompassing a shipping container containing a plurality of partially crystallized pellets with a degree of crystallinity of at least 20% and an It.V. of at least 0.70 dL/g which have not been solid state polymerized. Suitable shipping containers are those suitable for shipping in commerce, having a volume of at least 1 cubic meter or more, or 2 cubic meters or more, or 3 cubic meters or more, or 8 cubic meters or more, or 20 cubic meters or more, and include Gaylord boxes, rail tank cars, trailers for tractor trailers, and ship hulls. The It.V. of the pellets may any value identified above higher than 0.70 dL/g, and the degree of crystallinity may be any value higher than 20% as identified above.

Figure 1B:
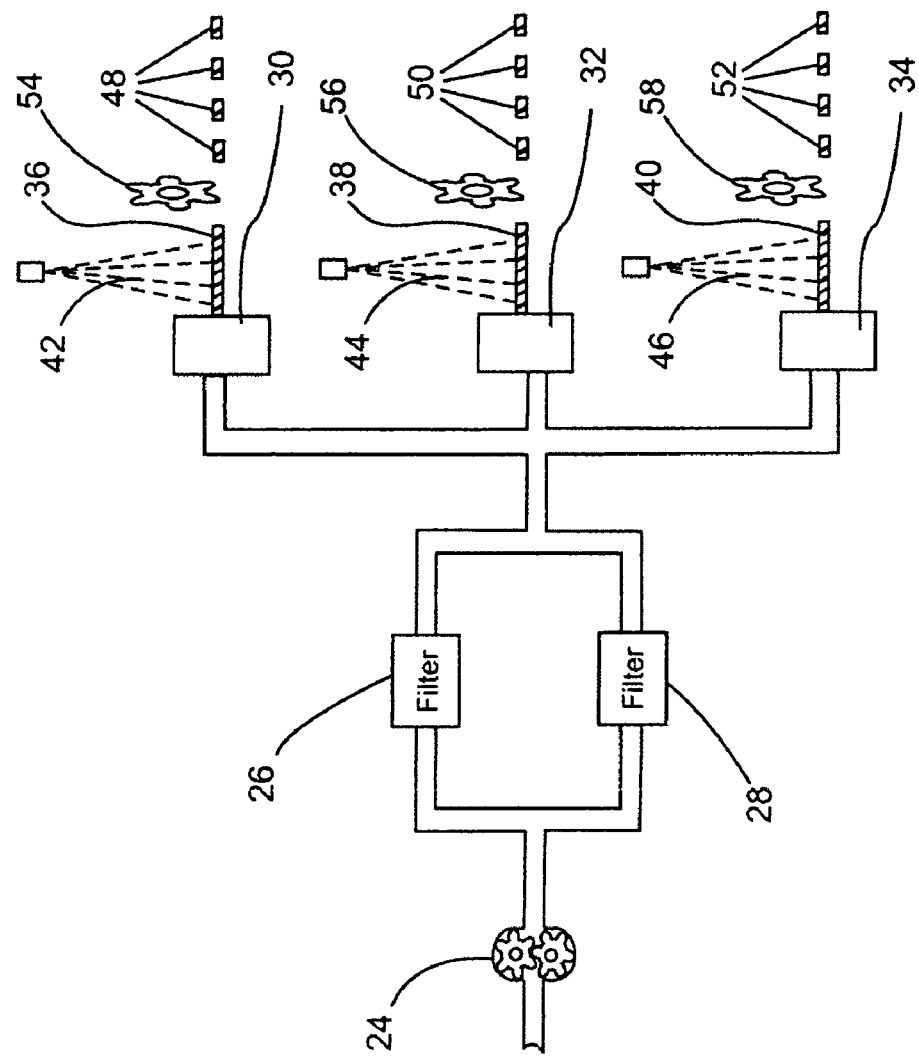
FIG. 1B is a schematic illustration of a polyester manufacturing line showing processing after polycondensation reactors using strand cutters to form the polyester pellets.

The pellets utilized in the methods of the invention are formed from a variety of methods known to those skilled in the art. Examples of such pellet forming processes include, but are not limited to, the processes depicted in FIGS. 1A, 1B, and 1C and described above. It should be recognized that the present invention provides, in at least one embodiment, an improvement over the crystallizer described in connection with the description of FIG. 1C. In particular, the present invention allows for a reduction in length of such crystallizers (i.e., along the direction that the pellets are conveyed) along with a concurrent significant decrease in equipment cost. The methods of the present embodiment are used to crystallize pellets of virtually any shape or size. Typically, at least a portion of the plurality of polymeric pellets includes three-dimensional objects characterized by a largest size dimension, which is less than 0.25 inches. Examples of shaped pellets that are usable in the practice of the present invention include, but are not limited to, spherically-shaped pellets, cylindrically shaped pellets, and pellets with a rectangular cross section.

Figure 2:
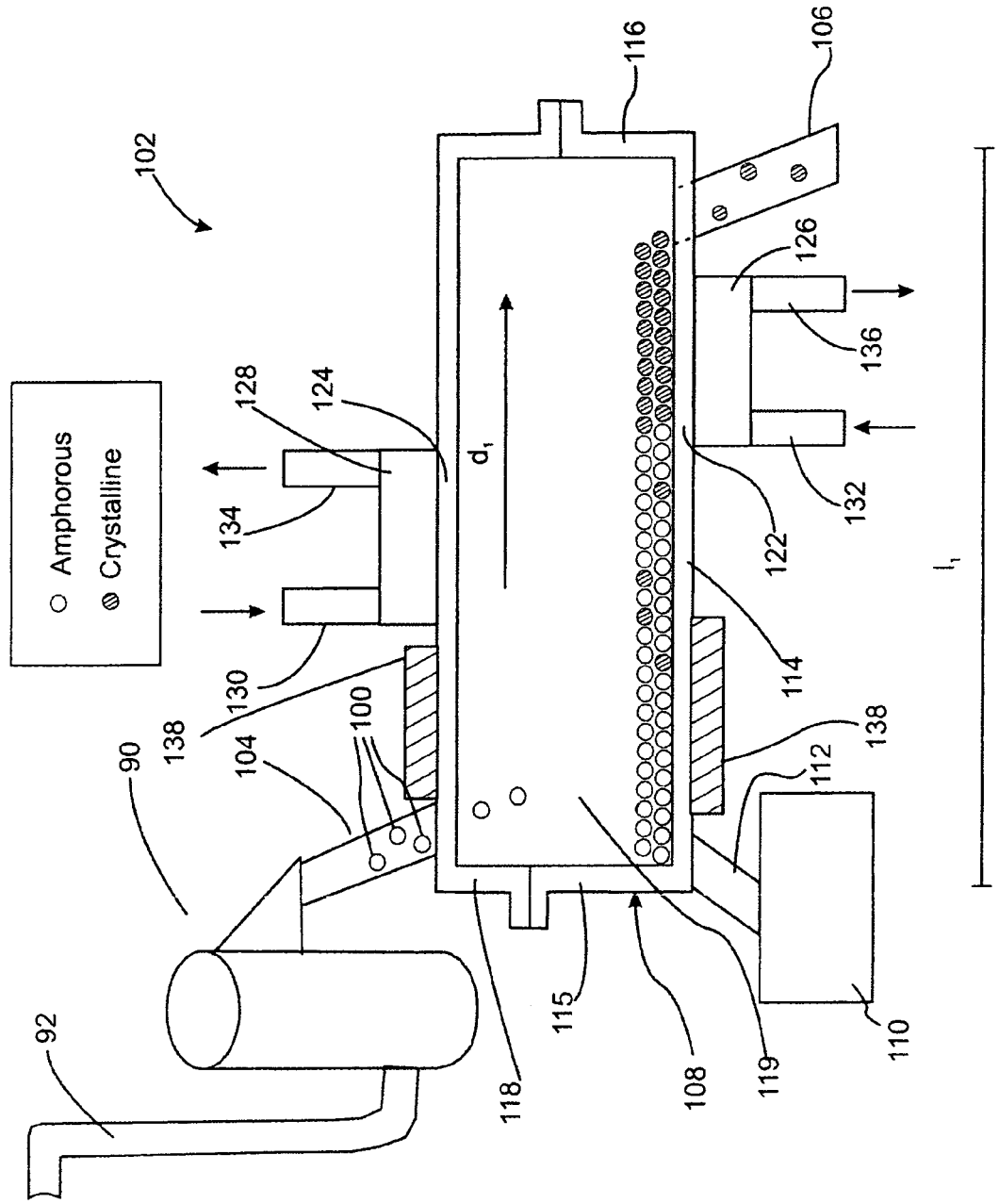
FIG. 2 is a schematic illustration of an embodiment of a crystallizer usable in the methods of the invention.

With reference to FIG. 2, a schematic illustration of an embodiment of the present invention is provided. The method of this embodiment comprises introducing a plurality of polymeric pellets 100 into crystallizer 102 via pellet inlet 104. In a variation, plurality of pellets 100 is introduced into the crystallizer in an amount of 5,000 lb/hr to 200,000 lb/hr. In a variation, recycled pellets may be introduced into crystallizer 102 along with polymeric pellets 100 via inlet 104. In this variation, the temperature of pellets 100 may be adjusted by varying the temperature of recycled pellets.

The plurality of polymeric pellets 100 has an initial average pellet temperature when introduced into crystallizer 102. In some variations of the present embodiment, pellets 100 are at an elevated temperature that is useful for crystallization to occur while the pellets are resident in crystallizer 102. In at least some embodiments, such as when the pellets 100 are PET, the elevated temperature is from 135° C. to 205° C., and in other embodiments from 105° C. to 200° C. The polymeric pellets may be provided in any manner including processes in which the polymeric pellets are reheated after cooling. An example of such a process includes PET strands cut by a strand cutter as set forth above in connection with the description of FIG. 1B.

Figure 1C:
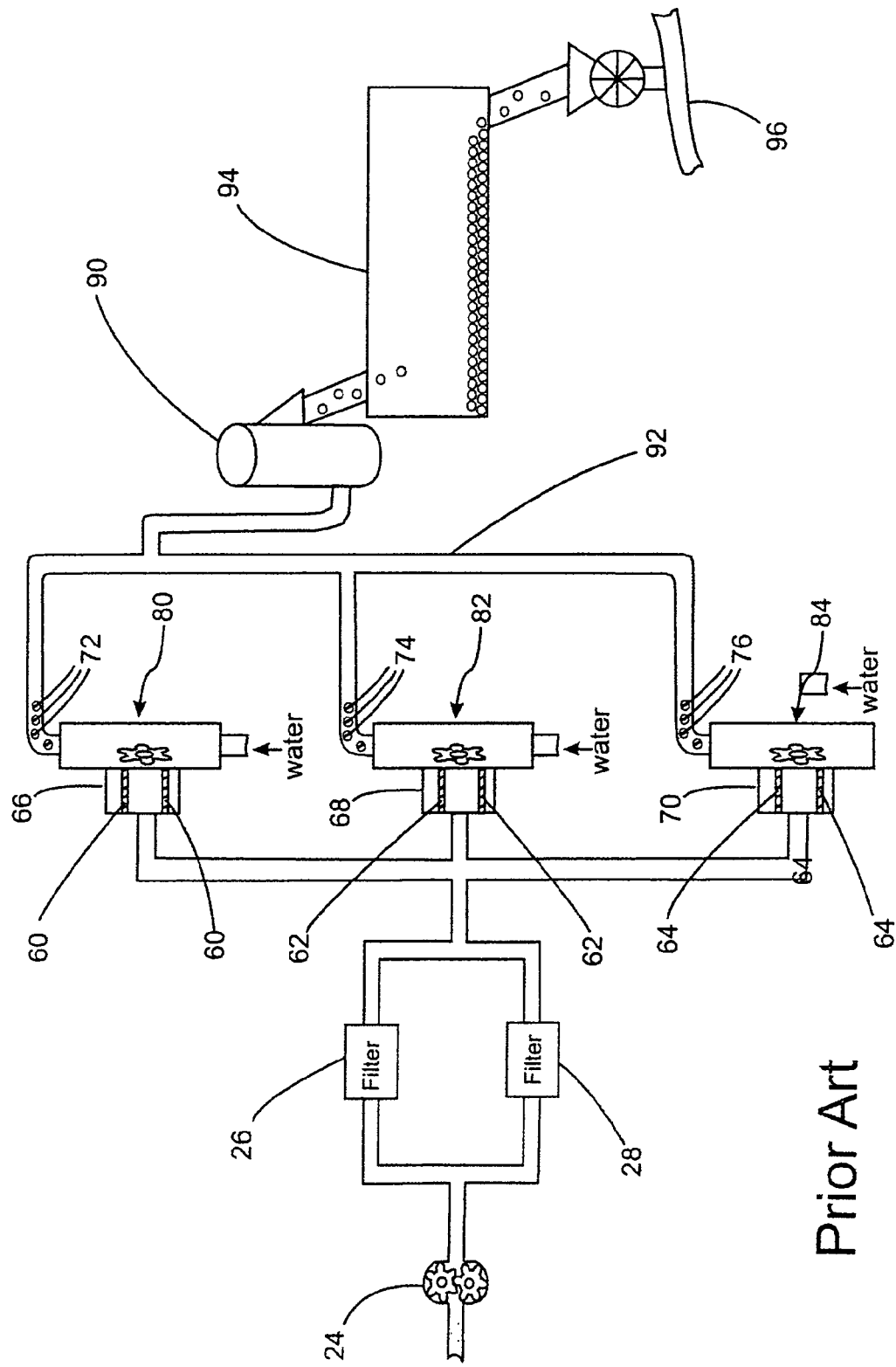
FIG. 1C is a schematic illustration of a polyester manufacturing line showing processing after polycondensation reactors using die face cutters to form the polyester pellets.

In a particularly useful variation of the present embodiment, polymeric pellets 100 are cut by die face pellet cutters as set forth above in connection with the description of FIG. 1C. In this variation, pellets 100 are transferred from the die face pellet cutters to dryer 90 via pellet conveying system 92. Examples of useful dryers include centripetal dryers that remove pellets 100 from the water. Upon exiting dryer 90, additional water may be boiled off due to the heat content of pellets 100, which is still relatively high upon emerging from dryer 90. In this variation, using die face pellet cutters, pellets 100 are transferred sufficiently quickly from the cutters to the dryer so that pellets 100 retain a substantial amount of heat. Typically, polymeric pellets exiting such a dryer have temperatures exceeding 135° C.

It should be appreciated that each of pellets 100 typically has a relatively non-uniform temperature distribution with the interior of pellets 100 being hotter than the exterior of the pellets. This is due to the cooling effect of the water used in the die face cutters and pellet conveying system 92 and the low thermal conductivity of the polymer. Moreover, each pellet is likely to have a slightly varying temperature profile. Therefore, it is appropriate to describe the plurality of pellets as having an average pellet temperature.

It should also be appreciated that the water used to transport pellets 100 from the die face cutters to dryer 90 may be substituted by other conveying fluids with superior or more desirable heat transfer properties. The average temperature of pellets 100 may also be controlled by the temperature of the water (or other conveying fluid) used to convey pellets 100 from the die face cutters to dryer 90. For example, the conveying fluid may be heated to allow for higher initial average pellet temperatures (introduced to crystallizer 102) or cooled to allow for lower initial average pellet temperatures. In a typical polyester forming process, the transit time from the die face cutters to dryer 90 is on the order of a few seconds with a pellet containing slurry traveling at a velocity from 10 to 30 feet/s while in pellet conveying system 92.

Crystallizer 102 conveys the plurality of pellets 100 along longitudinal direction $d_1$ from inlet 104 to pellet outlet 106 along conveyor 108. While being conveyed by the crystallizer 102, pellets 100 can be agitated to help prevent clumping or sticking together of pellets 100 as the average pellet temperature increases during crystallization because of liberation of the heat of crystallization. In at least one embodiment, motor 110 in contact with conveyor 108 by shaft 112 can provide such agitation. Such agitation may cause shaking or vibration of pellets 100. In general, conveyor 108 includes bottom wall 114, end walls 115, 116 and opposed side walls (not shown). Crystallizer 102 may also include optional top 118, which is positioned atop conveyor 108 to form cavity 119. In a further refinement of the invention, such agitation also conveys pellets 100 along direction $d_1$.

Pellets 100 are removed from the crystallizer 102 via pellet outlet 106 and transferred to the next processing or storage apparatus. The residence time of pellets 100 within crystallizer 102 can vary in dependence upon many factors, such as, the type of polymer being crystallized, the initial average pellet temperature, the throughput of pellets being processed, and the like. The residence time may vary from at least 1 second, or at least 1 minute, or at least or greater than 3 minutes, or at least or greater than 4 minutes, or at least or greater than 5 minutes, and up to about 1 hour, or up to 25 minutes, or up to 20 minutes, or up to 15 minutes, or up to 10 minutes.

Still referring to FIG. 2, crystallizer 102 includes one or more regions 122, 124 which are contacted by one or more heat transfer jackets 126, 128. The temperature of the one or more regions 122, 124 is adjusted by the heat transfer jackets 126, 128, thereby affecting the temperature of regions within cavity 119. The resulting temperature adjustment is such that the temperature of the one or more regions 122, 124 is sufficient to allow at least partial crystallization of the plurality of polymeric pellets 100 while maintaining the average pellet temperature below the melting temperature while the plurality of pellets is within the crystallizer 102.

The temperature of heat transfer jackets 126, 128 is controlled by flowing a heat transfer fluid into the jackets via conduits 130, 132 and out of the jackets via conduits 134, 136. Polymeric pellets 100 pass through regions in crystallizer 102 that are adjacent to one or more regions 122, 124 thereby causing the average pellet temperature to be adjusted with heat either transferred to or removed from pellets 100. In a variation, the heat transfer fluid is at a temperature from 0° C. to 190° C. for cooling and from 135° C. to 305° C. for heating. The temperature of the plurality of pellets 100 is advantageously adjusted in order to control the rate of crystallization. The higher the average temperature of pellets 100 the higher the rate of crystallization. If pellets 100 are too cold (i.e., below 135° C.), it can be relatively difficult to supply sufficient additional heat to achieve crystallization. If pellets 100 are too hot, the pellets may start to melt due to the heat of crystallization liberated as the pellets crystallize. The present embodiment of the invention advantageously allows the average pellet temperature to be optimized so as to minimize the length of crystallizer 102 because a higher initial average pellet temperature may be used with cooling as provided in the present invention inhibiting heating caused by the liberated heat of crystallization. Minimizing the length of crystallizer 102 reduces expenses associated with the purchase and maintenance of such crystallizers, which tend to be expensive. In a variation of the invention, at least a portion of the plurality of the plurality of pellets crystallize from inside to outside. This means that interior regions of the pellets, which are typically hotter than regions near or on the surface, crystallize first.

The heat transfer fluids usable in the present embodiment includes both gases and liquids. Virtually any fluid medium may be used for the heat transfer fluids so long as the fluids are compatible with operational temperatures desired. Moreover, such fluids are desirably low cost, not corrosive, thermally stable, recyclable, non-explosive, and the like. Heat transfer jackets 126, 128 utilize either vapor-phase or liquid-phase operation. In vapor phase operation, heat is transferred at the saturation temperature of the vapor thereby providing uniform and precisely controlled temperature adjustment. In liquid phase operation, the temperature of the liquid changes as heat is transferred. Therefore, in liquid phase operation there can be some non-uniformity even if the heat transfer fluid is cycled at a high rate through heat transfer jackets 126, 128. In a variation of the present invention, both liquid phase and vapor phase operation are utilized.

Suitable heat transfer fluids include, but are not limited to, water, petroleum oils, synthetic fluids, gases, and liquid metals. Examples of synthetic fluids include, but are not limited to, Therminol™ heat transfer fluids, Dowtherm™ heat transfer fluids, Marlotherm™ heat transfer fluids, KSK™ oils, Tetralin, Ucon HTF-500™, Ucan Thermofluid™ 17, Paratherm™ heat transfer fluids, Paracymene™, Syltherm™, ethylene glycol, water, and the like. Usable heat transfer coefficients are from 1 to 1000 BTU/(hr-ft$^2$-° F.). Examples of suitable gases that are useful as heat transfer fluids include, but are not limited to, air, nitrogen, carbon dioxide, hydrogen, helium, argon, and superheated steam. In particular, water may function as an inexpensive heat transfer medium. In another variation, demineralized water can be used to generate steam in heat transfer jackets 126, 128. Advantageously, the pressure of the steam can be controlled from a vacuum to a positive pressure. For example, for a temperature of 135° C., the pressure of the steam may be 45.4 psia, while at 200° C., the pressure of the steam may be about 225 psia. By controlling the pressure or vacuum inside heat transfer jackets 126, 128, the wall temperature of heat transfer jackets 126, 128 and therefore regions 122, 124 of crystallizer 102 are effectively controlled. In some variations, this wall temperature can be controlled from 50° C. to 300° C. In another example, hot water can be used to remove the heat.

In one variation of the present embodiment, polymer pellets 100 enter crystallizer 102 with an average temperature that is above an optimal temperature for crystallization. In this variation, the polymer pellets 100 are cooled by one or both of heating jackets 126, 128, which in this variation will have a heat transfer fluid flowing through having a lower temperature than that of the pellets 100. The method of the present variation is particularly useful for the crystallization of polyethylene terephthalate pellets, which usually start to crystallize at a temperature of 135° C. and melt at a temperature of 200° C. For every 10° C. increase in the average temperature of the polyethylene terephthalate pellets that enter crystallizer 102, the length $l_1$ of crystallizer 102 can be optimally reduced by a factor of two if sufficient cooling in accordance with the present invention is utilized. When pellets 100 have regions with sufficient heat content for crystallization to occur, the average pellet temperature increases as pellets 100 are conveyed along direction $d_1$. This temperature increase is the result of the liberation of the heat of crystallization from pellets 100 as they crystallize.

In one refinement of the present variation, the difference between the initial average pellet temperature (as introduced into crystallizer 102) and the crystallization temperature is less than the temperature rise induced by the crystallization of pellets 100 in the absence of external cooling. Therefore, in this refinement cooling is applied to pellets 100 via the heat transfer jackets 126, 128 at the point before an average temperature conducive to melting or sticking of pellets 100 occurs but after crystallization commences.

Figure 3:
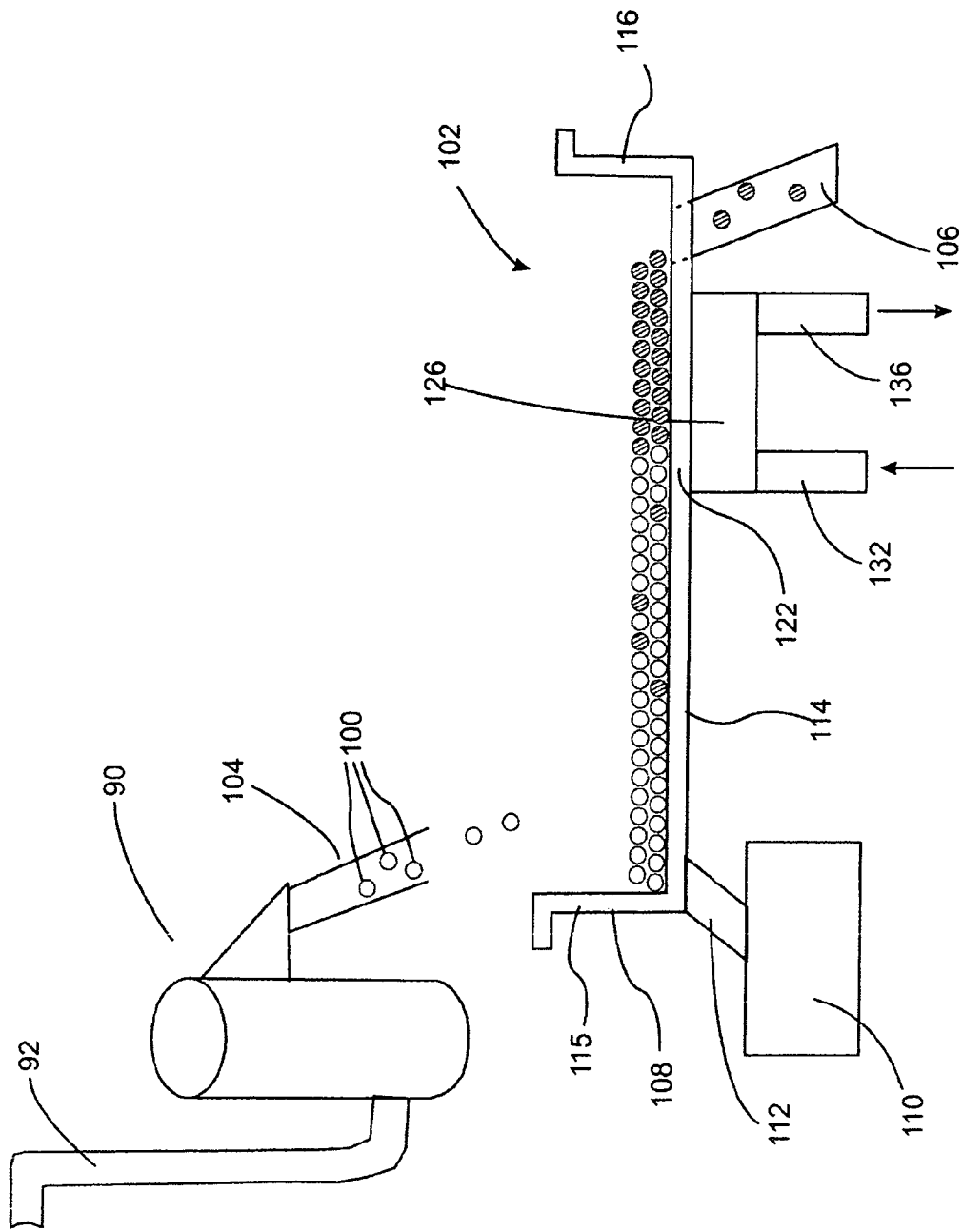
FIG. 3 is a schematic illustration of an embodiment of a crystallizer with an open top.

In a further refinement of the present variation, one or more sides of crystallizer 102 are partially or completely insulated by insulation as schematically illustrated at 138. If more cooling is needed a lesser amount or no insulation can be provided. Additional cooling of crystallizer 102 could also be realized by removing the top 118 of the crystallizer as illustrated in FIG. 3. In this variation, crystallizer 102 is of a construction without a top section. Even more cooling may be provided by directing air over the pellets with a fan. Such a crystallizer is usable where the pellets are to be used in applications allowing exposure of the pellets to ambient conditions.

In another variation of the present invention, the pellets will contain sufficient internal heat for crystallization to occur. In other variations of the present invention, the pellets do not contain sufficient heat for crystallization. In this latter variation, the average pellet temperature is adjusted by heat transfer jackets 126, 128 being operated at elevated temperature and optionally positioned near inlet 104. In other variations, a heating jacket (i.e., a heat transfer jacket that heats a region of crystallizer 102) and a cooling jacket (i.e., a heat transfer jacket that cools a region of crystallizer 102) are utilized with the cooling jacket positioned closer to inlet 104 than the heating jacket and the heating jacket positioned closer outlet 106 than the cooling jacket. In still other variations, a heating jacket and a cooling jacket are utilized with the heating jacket positioned closer to inlet 104 than the cooling jacket and the cooling jacket positioned closer outlet 106 than the heating jacket.

In another refinement of the present variation, polymeric pellets 100 are introduced to crystallizer 102 with a sufficient amount of heat so that there are regions in pellets 100 having a temperature greater than or equal to the crystallization temperature of the polymer from which pellets 100 are formed. Such a temperature results in at least partial crystallization while pellets 100 are within crystallizer 102 when the temperature becomes too great cooling can be applied.

Figure 4:
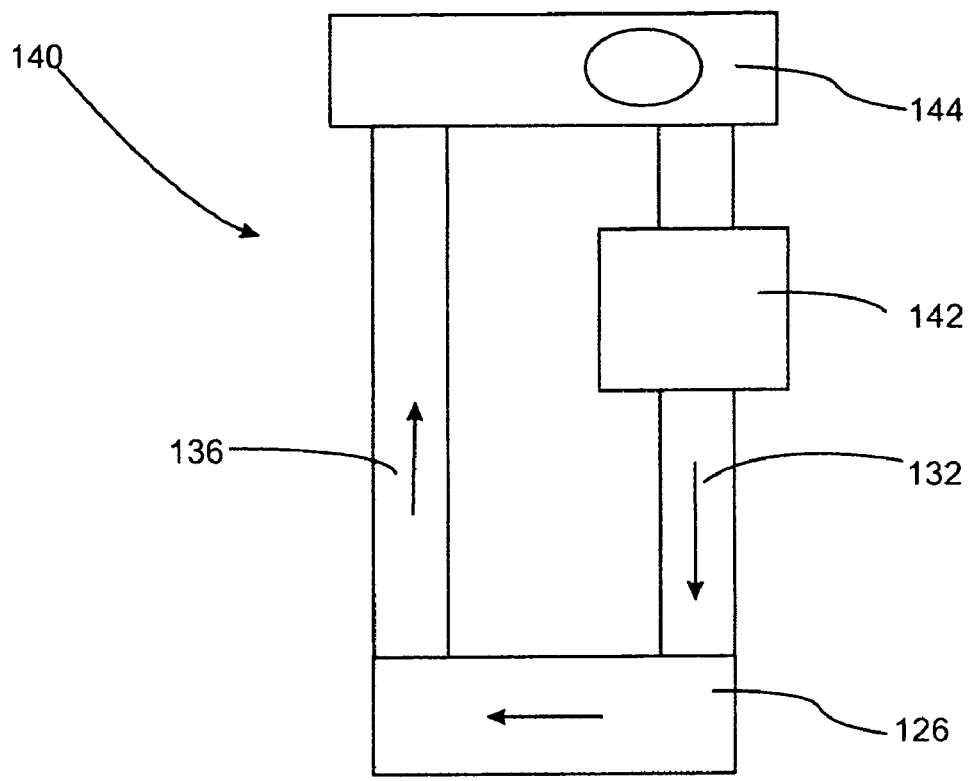
FIG. 4 is a schematic illustration of a recirculating heat transfer jacket.
Figure 5:
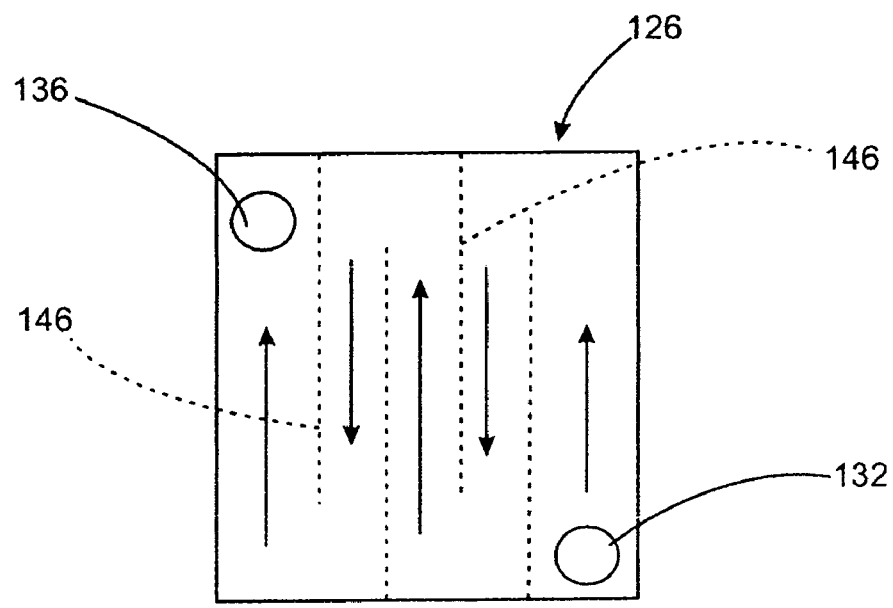
FIG. 5 is a schematic illustration of a baffled heat transfer jacket.

With reference to FIGS. 4 and 5, a schematic illustrations of a system for recirculating the heat exchange fluid through the heating jackets is provided. FIG. 4 is a schematic illustration of such a system. Recirculating heat exchange system 140 includes heat exchanger 142. Examples of devices suitable to be used for heat exchanger 142 include, but are not limited to, heat sinks, fans, refrigeration devices, resistance heaters, furnaces, and the like. Flow control device 144 is used to flow the heat exchange fluid through heat exchanger 142 and then through heat jacket 126. Examples of devices that are suitable to be used for flow control device 144 include, but are not limited to, metering compressors, flow meters, mass flow controller, valves, and the like. In a variation, the order of heat exchanger 142 and flow control device 144 may be reversed. FIG. 5 provides a variation in which the flow of the heat exchange fluid follows a serpentine path as guided by baffles 146.

Figure 6A:
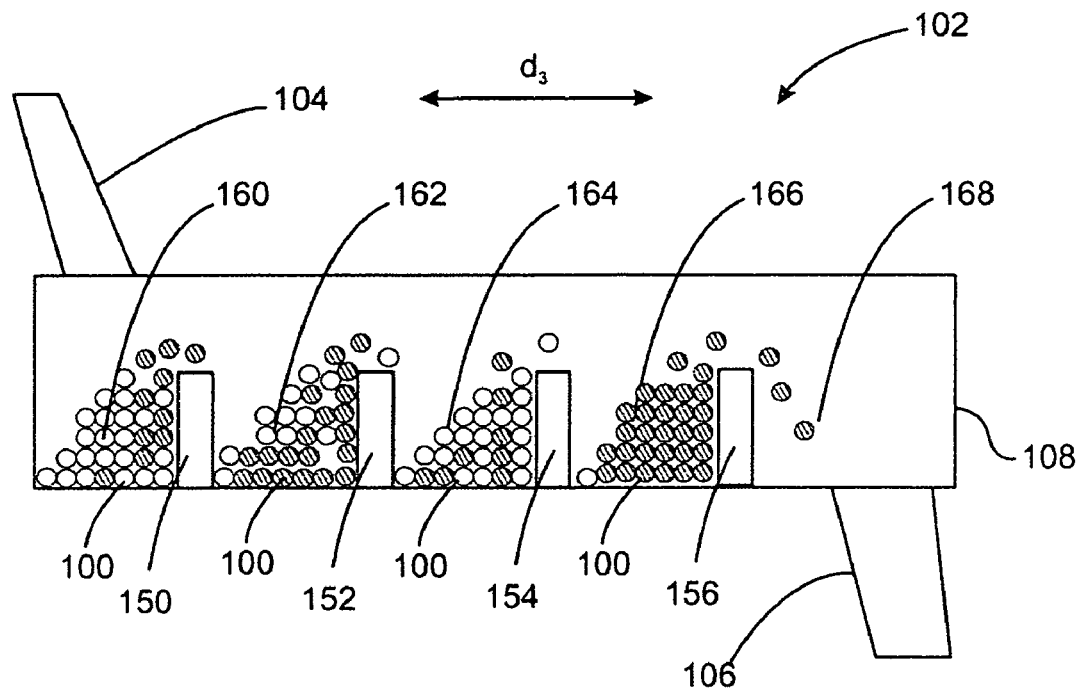
FIG. 6A is a schematic illustration of an embodiment of a crystallizer using partitions to assist in conveying the polymeric pellets.
Figure 6B:
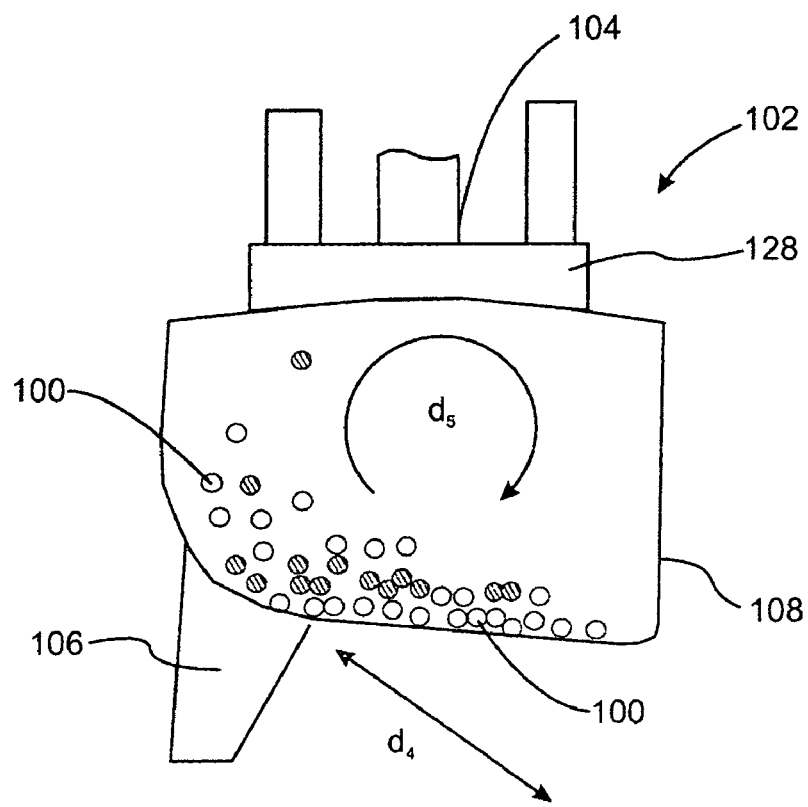
FIG. 6B is a schematic illustration of an embodiment of a crystallizer using a spiraling motion to convey the polymeric pellets.

With reference to FIGS. 6A and 6B, schematic illustrations of techniques that may be used to convey pellets 100 are provided. As set forth above, a motor may be used to vibrate the crystallizers of the invention in a manner such that pellets 100 are conveyed from inlet 104 to outlet 106. In FIG. 6A, crystallizer 102 includes partitions 150 to 156 that divide the hollow interior of crystallizer 102 into sections 160 to 168. Crystallizer 102 is vibrated along direction $d_3$, which acts to convey pellets 100. As pellets 100 fill sections 160 to 168 the vibrations cause some of pellets 100 near the top to be transported to an adjacent region. In FIG. 6B, a method of conveying pellets 100 in a spiraling fashion is illustrated. In this technique, conveyor 108 is vibrated along direction $d_4$ in such a manner to induce a spiraling motion $d_5$ as pellets 100 are conveyed from inlet 104 to outlet 106. In variations of these embodiments, the crystallizer may be inclined downward from inlet 104 to outlet 106 to help pellets 100 to move forward while being vibrated along direction $d_4$.

In another embodiment of the present invention, a crystallizer for crystallizing amorphous polymeric pellets is provided. With reference to FIGS. 2, 3, 4, and 5 idealized schematic illustrations of crystallizers of this embodiment are provided. Crystallizer 102 includes inlet 104 for receiving a plurality of polymeric pellets 100. Crystallizer 102 also includes a conveyor 108 for transporting the plurality of pellets 100 from a first location to a second location. In a variation of this embodiment, conveyor 108 is vibrated by motor 110 in a manner such that pellets 100 move toward pellet outlet 106. Advantageously, the conveyor 108 can also agitate pellets 100 as they are being conveyed so that sticking or clumping together can be minimized. Crystallizer 102 also includes heat transfer jackets 126, 128 for adjusting the temperature of one or more regions 122, 124 and thereby pellets 100. Pellet outlet 106 is used as set forth above for removal of the polymer pellets after crystallization.

Figure 7:
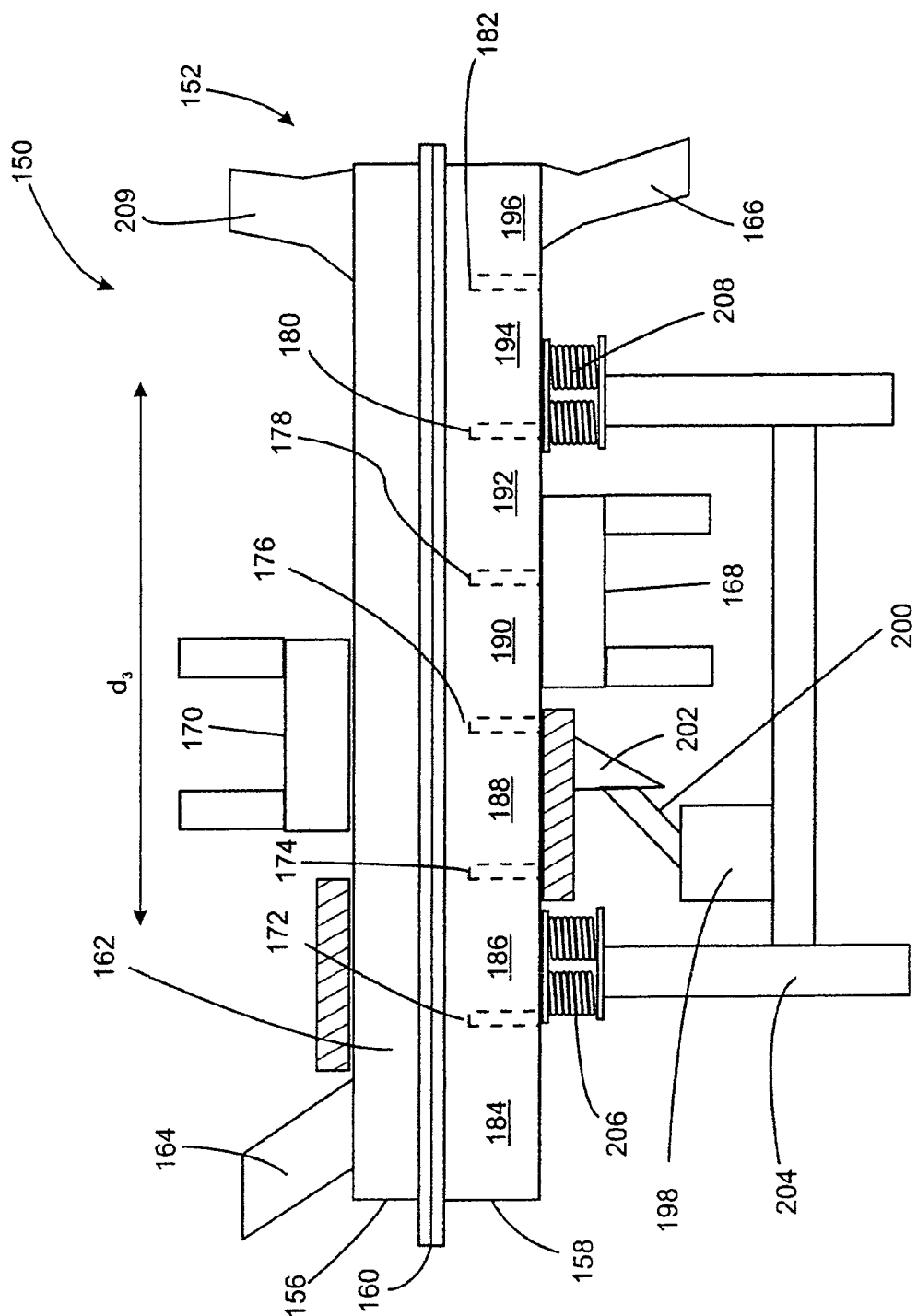
FIG. 7 is a side view of a crystallizer system using the crystallizer of FIG. 6A to convey the polymeric pellets.

With reference to FIG. 7, a schematic side view of a crystallizer that transports pellets in the manner depicted in FIG. 6A is provided. Crystallizer system 150 includes shaker deck 152 that has top section 156 and bottom section 158 which are attached together along joint 160. Together top section 156 and bottom section 158 define crystallizer cavity 162. Pellets 100 are introduced into pellet inlet 164 and removed through outlet 166 in the manner set forth above. Crystallizer system 150 includes heat transfer jackets 168, 170. Crystallizer system 150 also includes partitions 172 to 182 that divide shaker deck 152 into regions 184 to 196. Motor 198 shakes shaker deck 152 along direction $d_3$, which is substantially along the same direction as the pellets are conveyed from inlet 164 to outlet 166. In at least the illustrated embodiment, motor 198 is attached to bottom section 158 of shaker deck 152 via shaft 200 and attachment bracket 202. Crystallizer system 150 includes frame 204, which is attached to bottom section 158 by springs 206, 208. Springs 206, 208 provide the flexibility for vibration of shaker deck 152. Optionally, crystallizer system 150 includes vent 209.

Figure 8A:
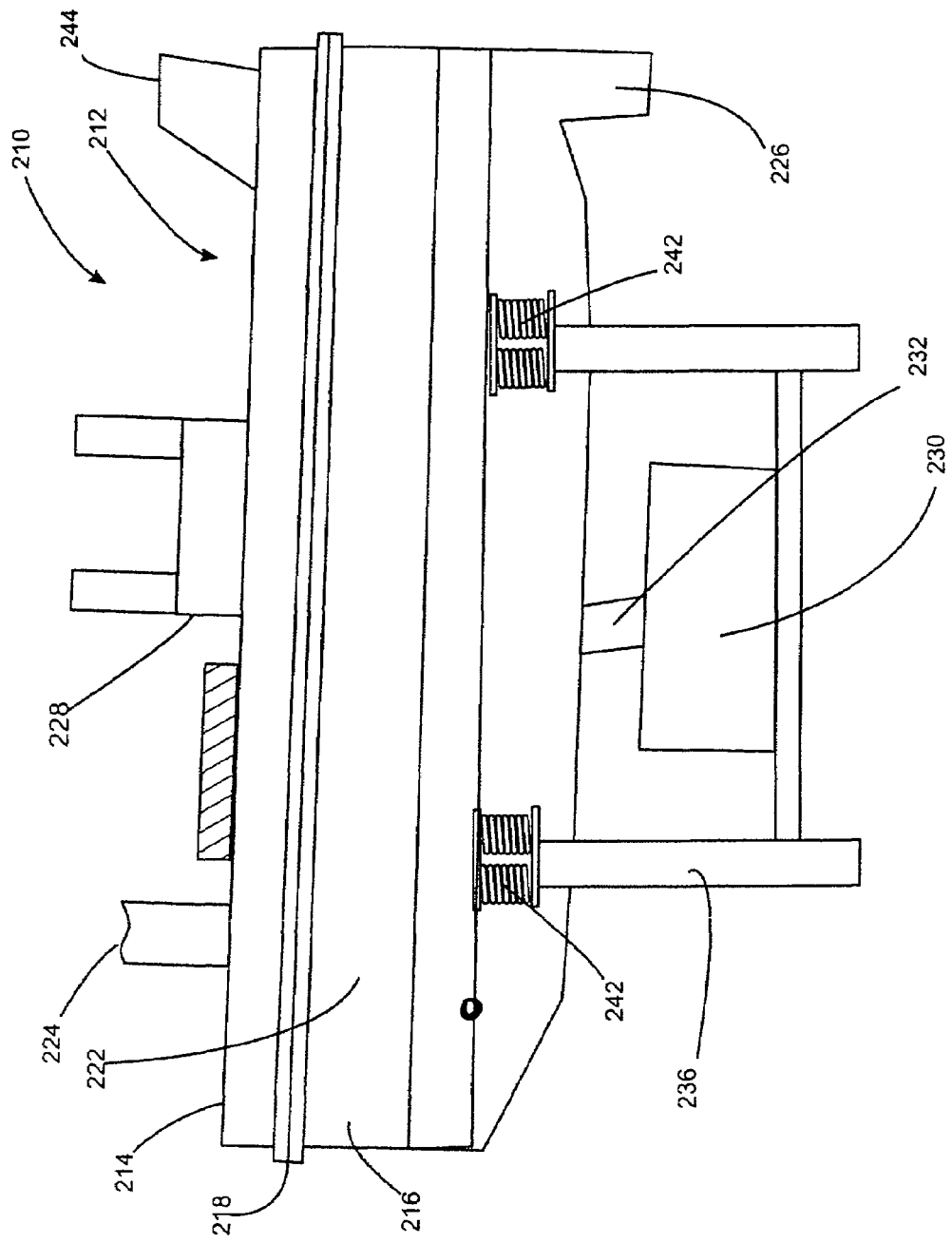
FIG. 8A is a side view of a crystallizer system using the crystallizer of FIG. 6B to convey the polymeric pellets.
Figure 8B:
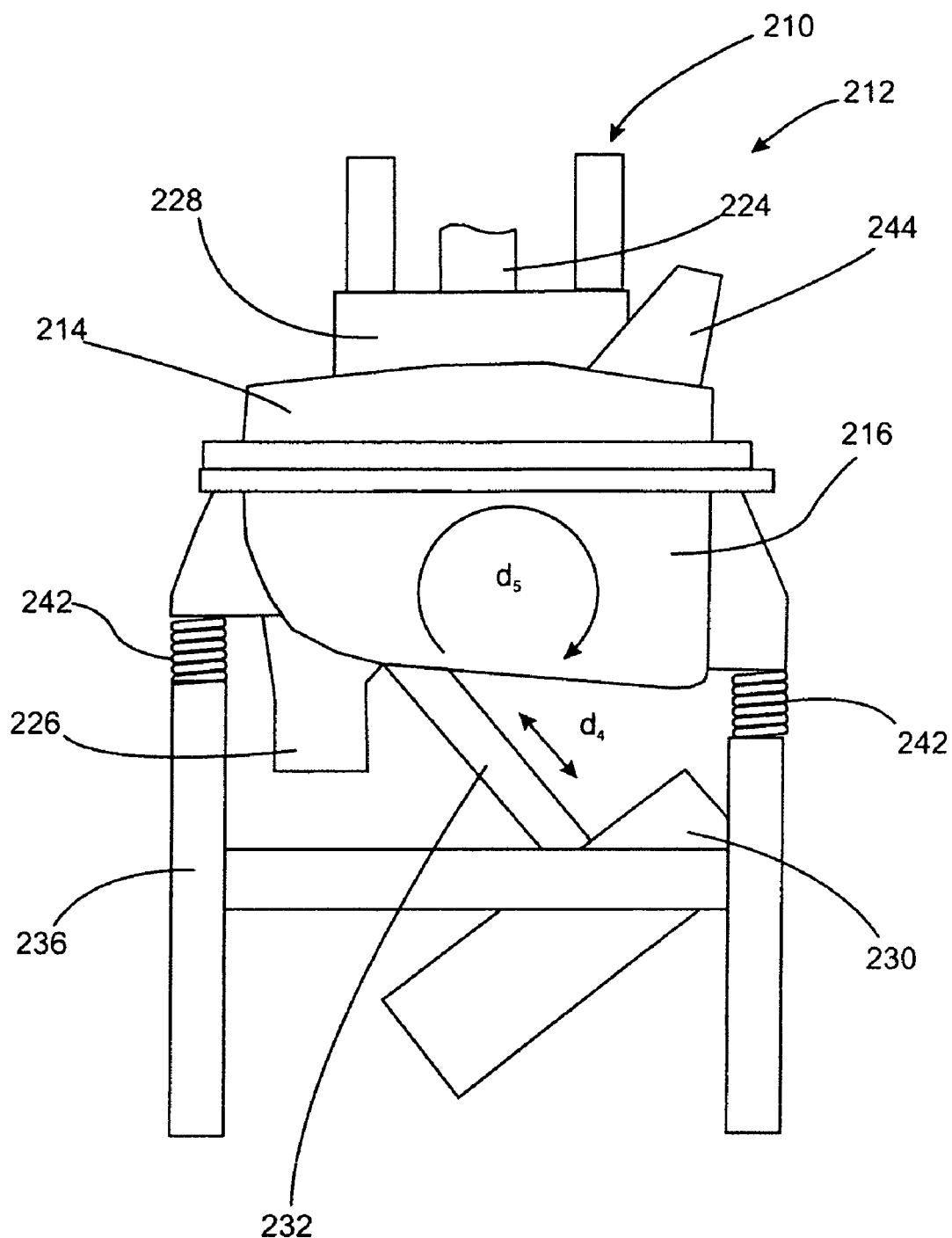
FIG. 8B is a front view of a crystallizer system using the crystallizer of FIG. 6A to convey the polymeric pellets.

With reference to FIGS. 8A and 8B, schematic illustrations of a crystallizer that transports pellets in a spiraling forward motion as depicted in FIG. 6B are provided. Crystallizer system 210 includes shaker deck 212, which has top section 214, and bottom section 216 which are attached together along joint 218. Together top section 214 and bottom section 216 define crystallizer cavity 222. Pellets are introduced into pellet inlet 224 and removed through outlet 226 in the manner set forth above. Crystallizer system 150 includes heat transfer jacket 228. Motor 230 shakes shaker deck 212 along direction $d_4$ (FIG. 8B) thereby causing the pellets to move from inlet 224 to outlet 226 with a spiraling motion as indicated by $d_5$. In at least the illustrated embodiment, motor 230 is attached to the bottom section 216 (FIG. 8A) of shaker deck 212 via shaft 232. Crystallizer system 210 includes frame 236, which is attached to bottom section 216 by springs 240, 242. Springs 240, 242 provide the flexibility for vibration of shaker deck 202. Crystallizer system 210 also includes vent 244, which is attached to shaker deck 212. In certain variations, shaker deck 212 is inclined downward from inlet 224 to outlet 226.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of crystallizing polymeric pellets in a crystallizer having an inlet and an outlet, the method comprising:
    a) introducing a plurality of polymeric pellets, wherein the plurality of polymeric pellets have an initial average temperature between 135° C. and 200° C., into the inlet of the crystallizer, the plurality of polymeric pellets comprising a crystallizable polymer having a crystallization temperature and a melting temperature and the plurality of polymeric pellets having an average pellet temperature;
    b) adjusting a temperature of one or more regions of the crystallizer with a heat transfer jacket to provide the temperature of the one or more regions that is sufficient to allow at least partial crystallization of the plurality of polymeric pellets while maintaining the average pellet temperature below the melting temperature while the plurality of polymeric pellets is within the crystallizer, wherein at least a portion of the plurality of polymeric pellets crystallize from inside to outside; and
    c) removing the plurality of polymeric pellets from the outlet of the crystallizer,
wherein the plurality of polymeric pellets are formed from solidifying a molten polyester polymer having an It.V. of at least 0.70 dL/g.

2. The method of claim 1 wherein the heat transfer jacket cools more than one region of the crystallizer.

3. The method of claim 1 wherein the heat transfer jacket has a temperature that is controlled by flowing a heat transfer fluid through the heat transfer jacket.

4. The method of claim 3 wherein the heat transfer fluid is a gas or liquid.

5. The method of claim 4 wherein the heat transfer fluid is a fluid selected from the group consisting of water, petroleum oils, synthetic fluids, gases, and liquid metals.

6. The method of claim 4 wherein the heat transfer fluid is a gas selected from the group consisting of air, nitrogen, carbon dioxide, hydrogen, helium, argon, and superheated steam.

7. The method of claim 4 wherein the heat transfer fluid is steam.

8. The method of claim 4 wherein the heat transfer fluid is at a temperature from 0° C. to 190° C. for cooling and from 135° C. to 305° C. for heating.

9. The method of claim 4 wherein the heat transfer fluid is water.

10. The method of claim 1 wherein the plurality of polymeric pellets introduced in step a) comprise regions having a temperature greater than or equal to the crystallization temperature of the polymer such that the plurality of polymeric pellets at least partially crystallize while inside the crystallizer.

11. The method of claim 4 wherein the heat transfer fluid has a temperature sufficient to allow at least partial crystallization of the plurality of polymeric pellets while maintaining a maximum pellet temperature below the melting temperature while the plurality of polymeric pellets is within the crystallizer.

12. The method of claim 1 wherein the difference between the average pellet temperature of the pellets in step a) and the crystallization temperature is less than the temperature rise induced by the crystallization of the plurality of polymeric pellets in the absence of external cooling during step b).

13. The method of claim 1 wherein the plurality of polymeric pellets is formed by cutting polymeric strands using a strand cutter.

14. The method of claim 1 wherein the plurality of polymeric pellets are formed by cutting polymeric strands using a die face pellet cutter.

15. The method of claim 1 wherein the plurality of polymeric pellets after step c) have a degree of crystallinity equal to or greater than 30%.

16. The method of claim 1 wherein the plurality of polymeric pellets after step c) have a degree of crystallinity equal to or less than 70%.

17. The method of claim 1 wherein the plurality of polymeric pellets after step c) have a degree of crystallinity equal to or greater than 40%.

18. The method of claim 1 wherein a portion of the plurality of polymeric pellets are three dimensional objects characterized by a largest size dimension, the largest size dimension being less than 0.25 inches.

19. The method of claim 1 wherein a portion of the plurality of polymeric pellets have a spherical shape.

20. The method of claim 1 wherein a portion of the plurality of polymeric pellets have a cylindrical shape.

21. The method of claim 1 wherein the plurality of polymeric pellets comprise polyethylene terephthalate.

22. The method of claim 1 wherein the plurality of polymeric pellets are agitated while being conveyed.

23. The method of claim 22 wherein the plurality of polymeric pellets are agitated by shaking.

24. The method of claim 22 wherein the plurality of polymeric pellets are agitated by directing the plurality of polymeric pellets to spiral.

25. The method of claim 1 wherein the crystallizer includes one or more sides that are partially or completely insulated.

26. The method of claim 1 wherein the crystallizer includes one or more sides that are completely uninsulated.

27. The method of claim 1 wherein the plurality of polymeric pellets are introduced into the crystallizer in an amount of 5,000 lb/hr to 200,000 lb/hr.

28. The method of claim 1 wherein the plurality of polymeric pellets have an average residence time from 1 second to 1 hour.

29. The method of claim 1 wherein the plurality of polymeric pellets have an average residence time from 1 minute to 10 minutes.

30. The method of claim 1, further comprising, in a continuous process, melt phase polymerizing virgin polyester molten polymer, solidifying the molten polymer to form the plurality of polymeric pellets in contact with water, separating at least a portion of the water from the plurality of polymeric pellets, and introducing the plurality of polymeric pellets into said crystallizer.

31. The method of claim 1 wherein the lt.V. is at least 0.72dL/g.

32. The method of claim 31 wherein the lt.V. is at least 0.76 dL/g.

33. A method of crystallizing PET pellets in a crystallizer having an inlet and an outlet, the method comprising:
  a) introducing a plurality of PET pellets, wherein the plurality of PET pellets have an initial average temperature between 135° C. and 200° C., into the inlet of the crystallizer, the plurality of PET pellets comprising a crystallizable polymer having a crystallization temperature and a melting temperature and the plurality of PET pellets having an average pellet temperature;
  b) adjusting the temperature of one or more regions of the crystallizer with a heat transfer jacket to provide a temperature that is sufficient to allow at least partial crystallization of the plurality of PET pellets while maintaining the average pellet temperature below the melting temperature while the plurality of PET pellets is within the crystallizer, wherein at least a portion of the plurality of PET pellets crystallize from inside to outside; and
  c) removing the plurality of PET pellets from the outlet of the crystallizer, wherein the plurality of PET pellets are formed from solidifying a molten PET polymer having an lt.V. of at least 0.70 dL/g.

* * * * *